United States Patent [19]

Hiramoto

[11] Patent Number: 5,195,857

[45] Date of Patent: Mar. 23, 1993

[54] FASTENER FOR A PLATE OR SHEET LIKE MEMBER

[75] Inventor: Kouji Hiramoto, Kanagawa, Japan

[73] Assignee: Nifco, Inc., Yokohama, Japan

[21] Appl. No.: 868,147

[22] Filed: Apr. 14, 1992

[30] Foreign Application Priority Data

Apr. 18, 1991 [JP] Japan .................. 3-35241[U]

[51] Int. Cl.⁵ .............................................. F16B 21/00
[52] U.S. Cl. ........................................ 411/344; 411/173
[58] Field of Search ............... 411/344, 340, 182, 173, 411/107, 908, 40, 44

[56] References Cited

U.S. PATENT DOCUMENTS 4,462,729 7/1984 Uhlig et al. .................. 411/344 X
4,850,773 7/1989 Asami ............................ 411/182 X

FOREIGN PATENT DOCUMENTS 3517620 11/1985 Fed. Rep. of Germany ........ 411/40

Primary Examiner—Rodney M. Lindsey
Attorney, Agent, or Firm—Schwartz & Weinrieb

[57] ABSTRACT

A fastener for securing an insulator in the form of a sheet onto a floor panel, comprising a stem portion adapted to be passed through and secured in a mounting hole provided in a floor panel or the like, a flange portion at a base end of the stem portion, and flat pieces which can be secured in a position to interpose the insulator between the flange portion and the flat pieces. The flat pieces may be bent toward the stem portion so that the flat pieces may be passed through an opening provided in the insulator along with the stem portion and then extended to the position for interposing the insulator between the flange portion and the flat pieces. The flat pieces may be provided with engagement means for securing them at this position. Once the fastener is thus integrally attached to the insulator, the positioning of the fastener is facilitated without requiring the relative positioning between the fastener and the insulator to be heeded. The fastener may consist of a female member to which a male member carrying another plate or sheet like material such as a floor mat may be secured so that the two layers may be secured to the floor panel in a layered arrangement with a desired firmness in a highly simple manner.

10 Claims, 6 Drawing Sheets

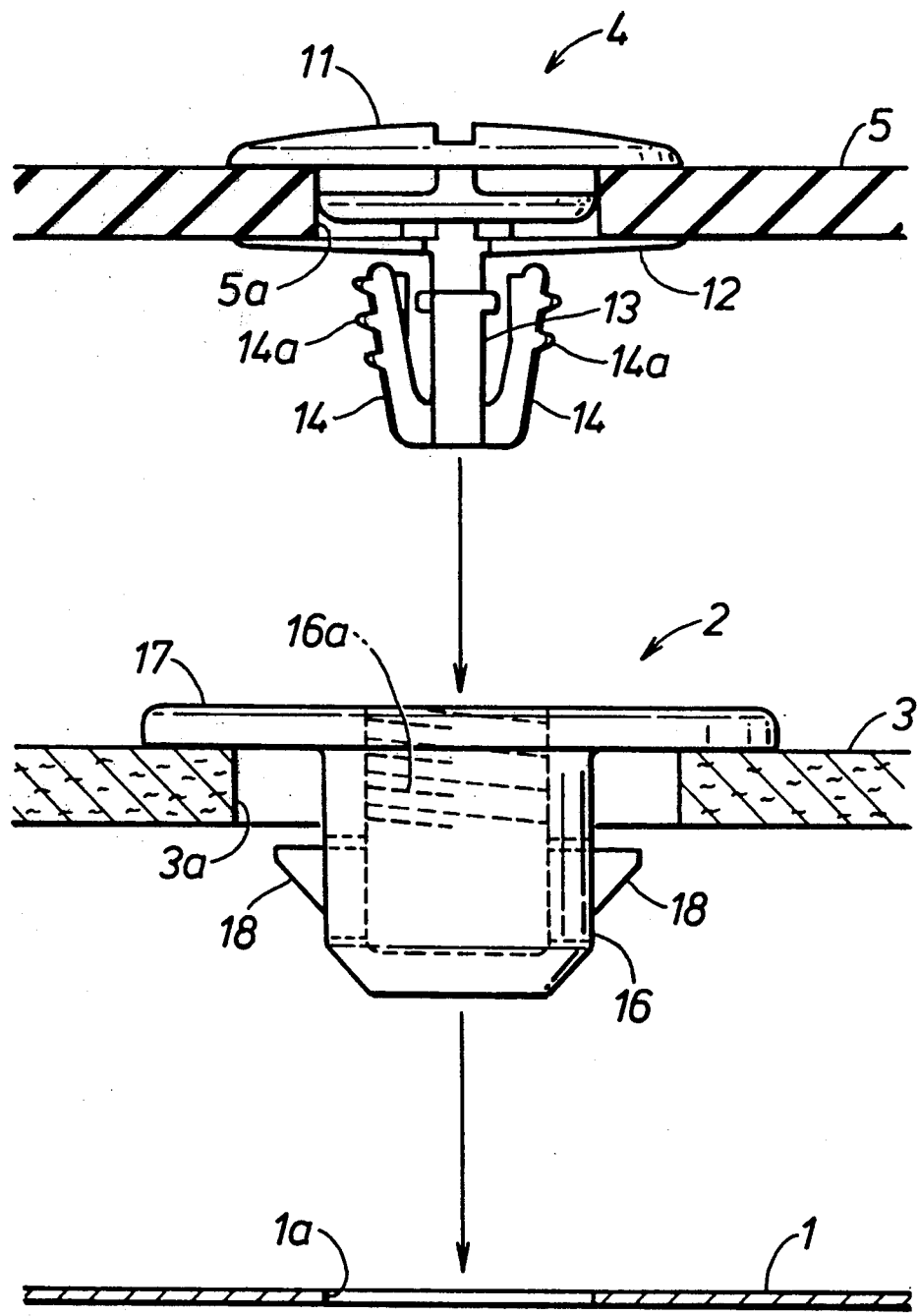

_(5,195,857)_

FASTENER FOR A PLATE OR SHEET LIKE MEMBER

TECHNICAL FIELD

The present invention relates to a fastener for securing a plate or sheet like member onto a main member.

BACKGROUND OF THE INVENTION

The floor of an automobile is typically covered by a floor mat, and an insulator in the form of an insulator board is interposed between the surface of a floor panel and the floor mat. Such a floor mat and insulator are typically secured to the floor panel by using a fastener such as the one shown in FIG. 6.

Referring to FIG. 6, after a female member 2 is fitted into a mounting hole 1a provided in a floor panel 1 to secure an insulator 3 onto the floor panel 1 therewith, a male member 4 securing a floor mat 5 is fitted into the female member 2 so that the insulator 3 and the floor mat 5 may be secured onto the floor panel 1 in a layered arrangement. The female member 2 is provided with a cup-shaped stem portion 16 which is to be fitted into an opening 3a of the insulator 3 and the mounting hole 1a, and a radial flange portion 17 extending outwardly from a base end of the stem portion 16, and the stem portion 16 is further provided with a pair of elastic engagement pieces 18 for preventing the female member 2 from coming off from the floor panel 1 by engaging with a lower surface of the floor panel 1 when the stem portion 16 is pushed into the mounting hole 1a.

The male member 4 is provided with a stem portion 13 which can be received inside the stem portion 16 of the female member 2, a pair of elastic legs 14 extending from a free end of the stem portion 13 in the opposite direction from the direction of fitting the stem portion 13 into the female member 2 and diverging in a symmetric fashion, and a disk-shaped head 11 extending radially from a base end of the stem portion 13. The stem portion 13 is further provided with a radial flange portion 12 which is spaced from the head 11 in a coaxial and parallel relationship. This flange portion 12 is divided into two semi-circular parts so that the floor mat 5 may be interposed between the head 11 and the flange portion 12 by passing the stem portion 13 through an opening 5a of the floor mat 5 and twisting each of the semi-circular parts of the flange portion 12 through the opening 5a.

According to this fastener, first of all, the stem portion 16 of the female member 2 is passed through the opening 3a of the insulator 3, and then through the mounting hole 1a with the insulator secured to the female member 2 until the elastic engagement pieces 18 are engaged by the lower surface of the floor panel 1 and the female member 2 is firmly secured to the floor panel 1. Then, the male member 4 with the floor mat 5 secured thereto as described above is coupled to the female member 2 by passing the stem portion 13 of the male member 4 into the interior of the female member 2 causing the teeth 14a provided in the elastic legs 14 to be pressed against the internal thread 16a provided in the female member 2 and the elastic legs 14 to be thereby elastically deformed, with the result that the insulator 3 and the floor mat 5 are secured to the floor panel 1 in a layered arrangement. The removal of the male member 4 can be readily accomplished by placing a tool into a groove provided in the head 11, and turning it in the direction to loosen the threading between the teeth 14a of the legs 14 and the internal thread 16a of the female member 2.

According to this conventional structure, the stem portion 16 of the female member 2 can move within the opening 3a of the insulator 3 in both the radial and axial directions when mounting the insulator 3 on the floor panel 1. Therefore, the female member 2 needs to be properly positioned with respect to the mounting hole 1a while aligning the opening 3a of the insulator 3 with the mounting hole 1a, and this complicates the process of positioning the various parts during the assembly work, thereby lowering the work efficiency.

OBJECTS OF THE INVENTION

In view of such problems of the prior art, a primary object of the present invention is to provide a fastener for securing a plate or sheet like member onto a main member which can simplify the process of positioning various parts thereof and improve the work efficiency.

A second object of the present invention is to provide a fastener for securing a plate or sheet like member onto a main member which is capable of firmly securing a plate or sheet like member onto a main member.

SUMMARY OF THE INVENTION

These and other objects of the present invention can be accomplished by providing a fastener for mounting a plate or sheet like member onto a main member, comprising: a stem portion which is adapted to be passed through an opening provided in the plate or sheet like material and a mounting hole provided in a main member; stem engagement means for securing the stem portion in the mounting hole of the main member; a flange portion provided at a base end of the stem portion; an engagement piece provided on the stem portion so as to be moveable between a first position for interposing the plate or sheet like member between the engagement piece and the flange portion, and a second position for being passed through the opening of the plate or sheet like member with the stem portion; and elastic engagement means provided between the engagement piece and the stem portion for selective retention of the engagement piece at the first position.

Preferably, the engagement piece consist of a pair of flat pieces hinged at their base ends to the stem portion. The flat pieces may be bent toward the stem portion so that the flat pieces may be passed through an opening provided in the plate or sheet like member which may consist of an insulator along with the stem portion and then extended to the position for interposing the plate and sheet member between the flange portion and the flat pieces. The flat pieces may be provided with engagement means for securing them at this position. Since the fastener is thus integrally attached to the plate or sheet like member, the positioning of the fastener is facilitated without requiring the relative positioning between the fastener and the insulator to be heeded. The fastener may consist of a female member to which a male member carrying another plate or sheet like material such as a floor mat may be secured so that the two layers may be secured to the floor panel in a layered arrangement with a desired firmness in a highly simple manner According to a preferred embodiment, means are provided for the purpose of achieving secure retention of the engagement piece at its first position. For this purpose, the elastic engagement means may comprise a first engagement structure consisting of a first hook provided on an upper surface of each of the flat pieces at the first position, and corresponding receptacles defined underside of the flange portion for selective engagement with the first hooks, and a second engagement structure consisting of a second hook projecting sideways from each of the flat pieces, and corresponding receptacles facing sideways from the flange portion for selective engagement with the second hooks.

BRIEF DESCRIPTION OF THE DRAWINGS

The present invention will now be described being made the following detailed description with references to the appended drawings, in which like reference characters designate like or corresponding parts throughout the several views, and wherein:

FIG. 6 is a sectional side view showing the manner in which a conventional fastener is used.

DETAILED DESCRIPTION OF THE PREFERRED EMBODIMENTS

Figure 1:
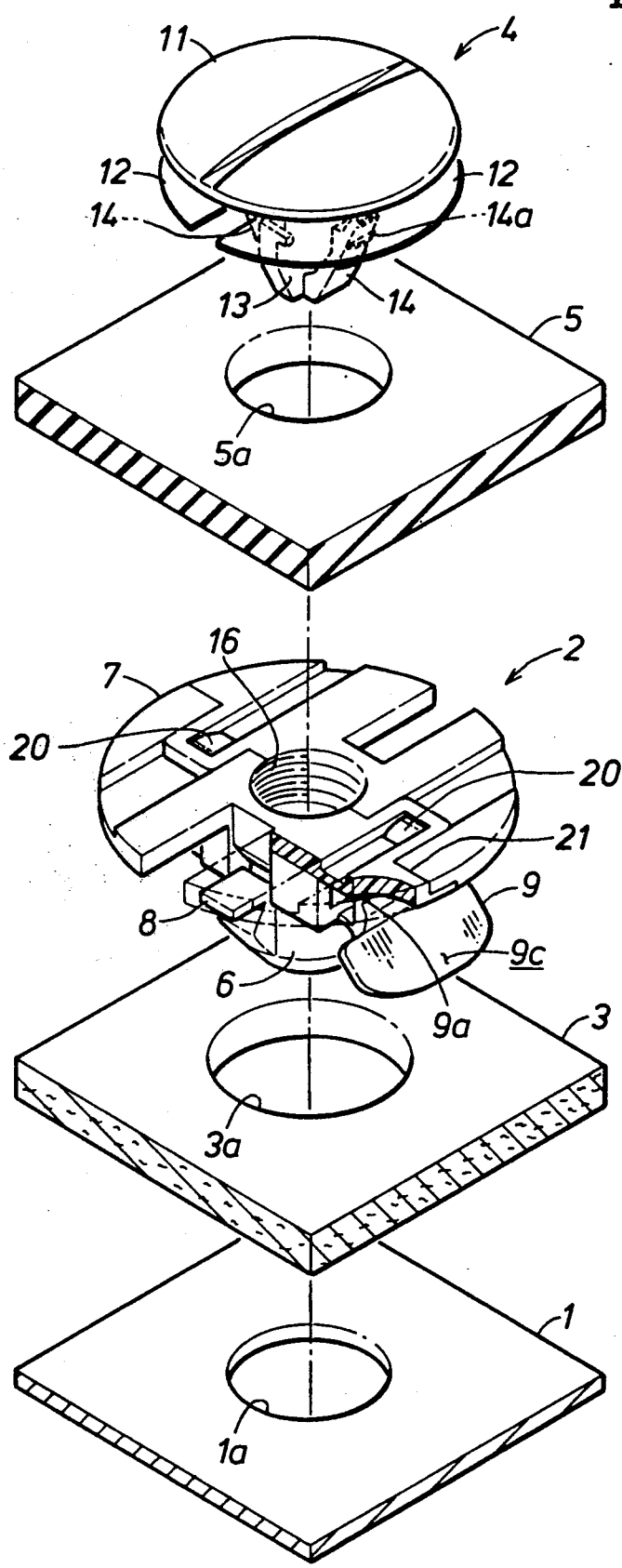
FIG. 1 is an exploded perspective view of a fastener constructed according to the present invention.

Referring to FIG. 1 in which those parts similar to those of the conventional fastener shown in FIG. 6 are denoted with like numerals. This fastener according to the present invention is provided with a female member 2 which is to be secured to a floor panel 1 along with an insulator 3, and a male member 4 which is to be secured to the female member 2 along with a floor mat 5 basically in the same way as the conventional fastener illustrated in FIG. 6. In particular, the male member 4 is identical to that used in the conventional fastener, and the description thereof is not repeated herein to avoid redundancy.

Figure 2:
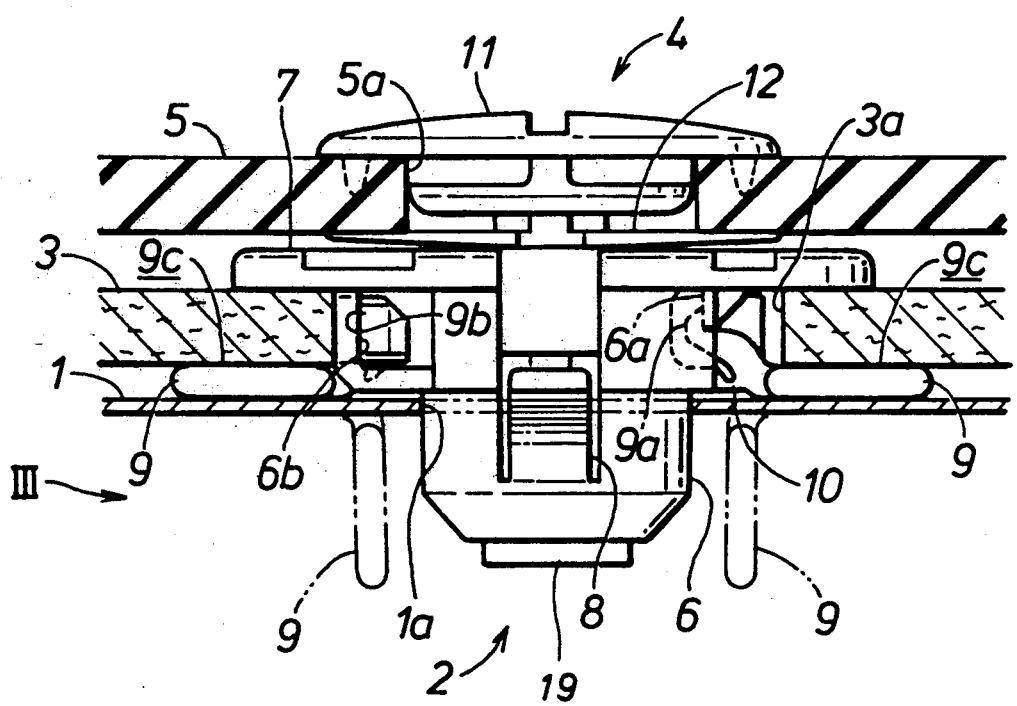
FIG. 2 is a side view of the fastener in use.

Referring to FIGS. 1 and 2, the female member 2 is provided with a cup-shaped stem portion 6, and a flange portion 7 which extends radially and outwardly from a base end of the stem portion 6 so as to extend along the upper surface of the floor panel 1 when the stem portion 6 is passed through a mounting hole 1a provided in the floor panel 1. This female member 2 is split into two parts along a longitudinal parting plane 21, and the two parts are joined together by a plastic hinge 19 consisting of a thinned part of the plastic material which makes up the fastener. The two parts are joined together by elastic engagement means 20 provided in the opposing faces of the two parts at the flange portion 7 defining the parting plane 21 as shown in FIG. 1.

The stem portion 6 of the female member 2 is provided with a pair of elastic engagement pieces 8 at diagonally opposed positions for preventing the female member 2 from coming off, by elastically engaging with the part of the floor panel 1 surrounding the mounting hole 1a when the stem portion 6 is passed through the mounting hole 1a. The base end of the stem portion 6 projecting from the upper surface of the floor panel 1 when the female member 2 is mounted on the floor panel 1 is provided with a pair of engagement pieces 9 consisting of wing-like flat pieces via plastic hinges 10 consisting of thinned parts of the plastic material for allowing the engagement pieces 9 to be elastically bent between a horizontal position for interposing the insulator 3 between the flange portion 7 and the engagement pieces 9 as indicated by the solid lines in FIG. 2 and a vertical position as indicated by the imaginary lines in FIG. 2. These engagement pieces 9 are located 90 degrees displaced from the pair of elastic engagement pieces 8, and are disposed in a spaced apart relationship to the lower surface of the flange portion 7 at their horizontal position.

Figure 3:
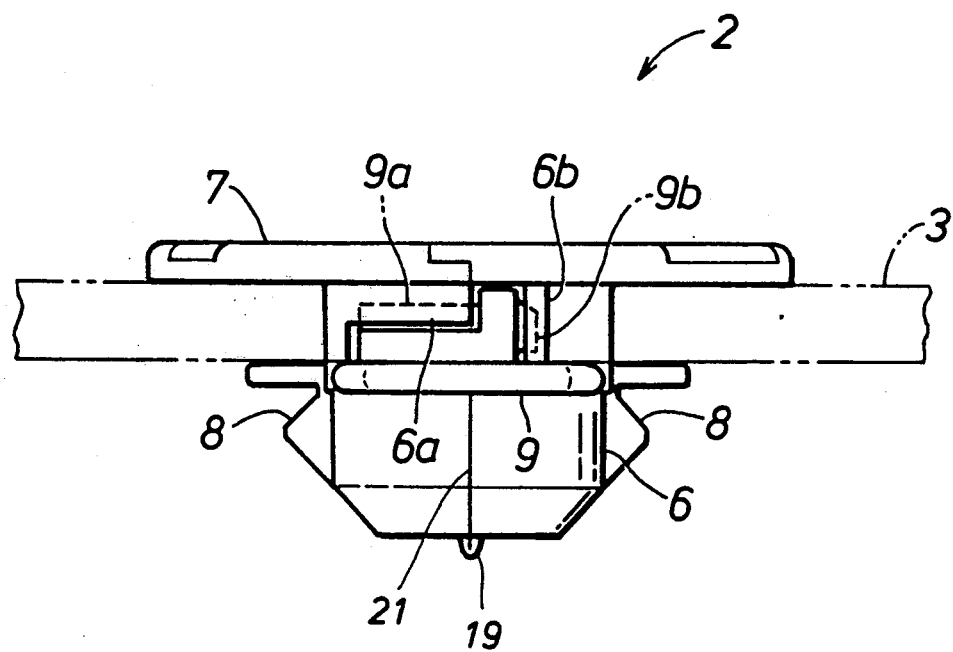
FIG. 3 is a side view as seen from the direction indicated by the arrow III of FIG. 2.
Figure 4:
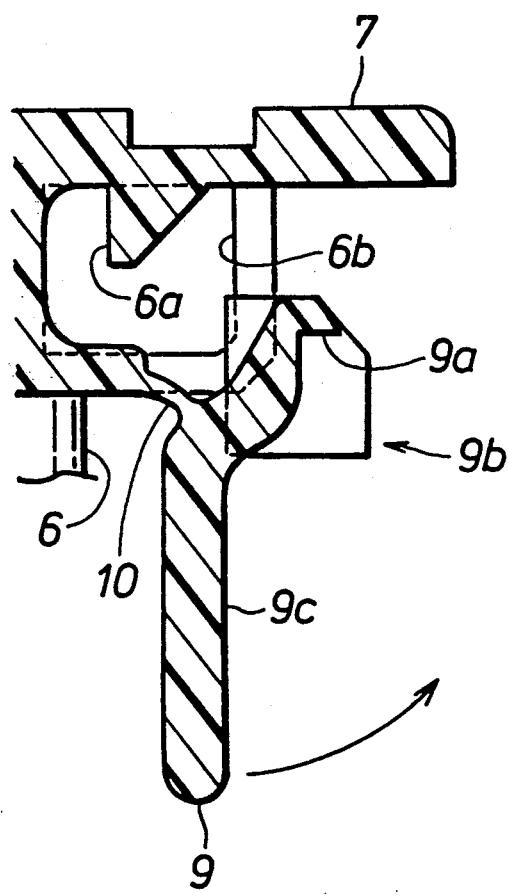
FIG. 4 is a sectional view of a part of the fastener before, the engagement pieces are engaged.
Figure 5:
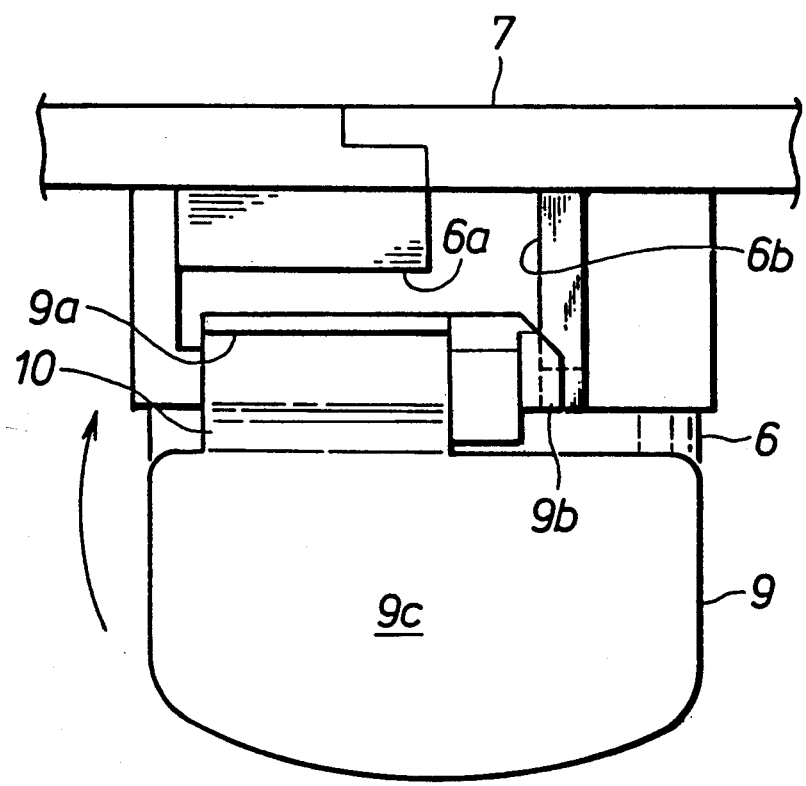
FIG. 5 is a front view of a part of the fastener before the engagement pieces are engaged.

A part of the base end of each of the engagement pieces 9 adjacent to the corresponding hinge 10 is provided with a first engagement projection 9a which extends in the shape of a hook on the side of an outwardly facing support surface 9c of the engagement piece 9 as best illustrated in FIG. 4 so that, when the engagement piece 9 is rotated or bent in the direction indicated by the arrow in FIG. 4 to a position to engage the insulator 3, a first engagement receptacle 6a defined in a lower surface of the flange portion 7 elastically engages the first engagement projection 9a, and the engagement piece 9 is retained in the above mentioned position. On one side of the first engagement projection 9a is provided a second engagement projection 9b extending sideways as illustrated in FIGS. 3 and 5 so that, in the above mentioned position for interposing the insulator 3, the second engagement projection 9b may be elastically engaged by a L-shaped second engagement receptacle 6b defined between the outer circumferential surface of the stem portion 6 and the lower surface of the flange portion 7.

Therefore, even when the fastener is moved axially or rotated around its axial line, and the engagement pieces are subjected to an external force in the direction of its rotational movement or in the direction perpendicular thereto, the above described two engagement structures ensure a condition of secure engagement, and reduce the burden on the hinge 10, thereby improving the durability of the fastener. In particular, the engagement by the second engagement projection 6b restricts the lateral movement of the corresponding engagement piece 9, and ensures a firm engagement by the first engagement projection 9a.

Now is described the manner in which the above described fastener is used to secure an insulator 3 and a floor mat 5 onto a floor panel 1. First of all, the stem portion 6 of the female member 2 is passed through the opening 3a of the insulator 3 with the engagement pieces 9 placed against the stem portion 6 so that the engagement pieces 9 may be passed through the opening 3a along with the stem portion 6. Thereafter, the engagement pieces 9 are rotated or lifted up so as to extend substantially in parallel with the flange portion 7, and the first engagement projections 9a are elastically engaged with the first engagement receptacles 6a while the second engagement projections 9b are elastically engaged with the second engagement receptacles 6b so that the insulator 3 may be securely interposed between the flange portion 7 and the engagement pieces 9.

Once the insulator 3 is thus integrally joined with the female member 2, the stem portion 6 is passed through the mounting hole 1a until the elastic engagement pieces 8 are engaged with the floor panel 1 to secure the female member 2 onto the floor panel 1. Since the female member 2 and the insulator 3 are already joined integrally together, positioning of the female member 2 relative to the mounting hole 1a can be easily accomplished when securing the female member 2 to the floor panel 1, and the assembly work is accordingly simplified. Thereafter, by pushing the male member 4 into the female member 2 along with the floor mat 5 interposed between its head 11 and flange portion 12 in the conventional manner, the insulator 3 and the floor mat 5 are firmly secured to the floor panel 1 in a layered arrangement as illustrated in FIG. 1.

Thus, according to the present invention, the fastener can be mounted on a main member such as a floor panel with a plate or sheet like member interposed between the flange portion and the engagement pieces, and the need for positioning during the assembly work is limited to the positioning of the fastener relative to the main member, thereby simplifying the overall assembly work.

Although the present invention has been described in terms of a preferred embodiment thereof, it is obvious to a person skilled in the art that various alterations and modifications are possible without departing from the scope of the present invention which is set forth in the appended claims.

What we claim is:

1. A fastener for mounting a plate or sheet-like member onto a support member, comprising:
   a stem portion which is adapted to be passed through an opening provided within said plate or sheet-like member and a mounting hole provided within said support member;
   stem engagement means for securing said stem portion within said mounting hole of said support member;
   a flange portion provided upon one end of said stem portion;
   engagement means provided upon said stem portion so as to be moveable between a first position for enabling said engagement means to be passed through said opening of said plate or sheet-like member along with said stem portion, and a second position at which said engagement means engages said plate or sheet-like member so as to cooperate with said flange portion in securing said plate or sheet-like member between said flange portion and said engagement means prior to insertion of said stem portion through said mounting hole of said support member such that said fastener and said plate or sheet-like member comprise an assembly to be mounted upon said support member; and
   elastic engagement means provided between said engagement means and said stem portion for selective retention of said engagement means at said second position.

2. A fastener according to claim 1, wherein said stem portion is substantially cup shaped with an open end thereof being located centrally upon an outer surface of said flange portion, and is internally provided with means for engaging another member therewithin.

3. A fastener according to claim 2, wherein:
   said another member comprises another fastener carrying another plate or sheet-like member which is to be disposed over said first-mentioned plate or sheet-like member when said another fastener is secured within said open end of said cup-shaped stem portion.

4. A fastener as set forth in claim 3, wherein:
   said plate or sheet-like member comprises an insulator panel;
   said support member comprises a floor-board of an automobile; and
   said another plate or sheet-like member comprises an automobile floor mat.

5. A fastener according to claim 1, wherein said engagement means comprises of a pair of flat pieces which are joined to said stem portion by plastic hinges having hinge lines extending tangentially along a circumference of said stem portion, and said elastic engagement means comprises a hook provided on an upper surface of each of said flat pieces at said first position, and corresponding receptacles defined underside of said flange portion and adapted to be engaged by said hooks.

6. A fastener according to claim 5, wherein said elastic engagement means comprises means for restricting lateral movement of each of said flat peices.

7. A fastener according to claim 5, wherein said elastic engagement means further comprises another hook projecting sideways from each of said flat pieces, and corresponding receptacles facing sideways from said flange portion and adapted to be engaged by said other hooks.

8. A fastener as set forth in claim 1, wherein:
   said plate or sheet-like member comprises an insulator panel; and
   said support member comprises a floor-board of an automobile.

9. A fastener as set forth in claim 1, wherein:
   said engagement means comprise a pair of diametrically opposed wing-like members pivotably mounted upon said stem portion by means of thinned hinge means integrally connecting said engagement means and said stem portion.

10. A fastener as set forth in claim 9, wherein:
    said stem engagement means comprise a pair of diametrically opposed engagement tabs which are disposed within a plane of said stem portion which is perpendicular to a second plane of said stem portion within which said wing-like members are disposed.

* * * * *